United States Patent
Chen et al.

(10) Patent No.: US 12,209,890 B2
(45) Date of Patent: Jan. 28, 2025

(54) OPTICAL SENSOR MODULE INCLUDING AN INTERFEROMETRIC SENSOR AND EXTENDED DEPTH OF FOCUS OPTICS

(71) Applicant: Apple Inc., Cupertino, CA (US)

(72) Inventors: Tong Chen, Fremont, CA (US); Ahmet Fatih Cihan, San Jose, CA (US); Daryl I. Vulis, San Francisco, CA (US); Mingzhou Jin, San Jose, CA (US)

(73) Assignee: Apple Inc., Cupertino, CA (US)

( * ) Notice: Subject to any disclaimer, the term of this patent is extended or adjusted under 35 U.S.C. 154(b) by 49 days.

(21) Appl. No.: 17/710,682

(22) Filed: Mar. 31, 2022

(65) Prior Publication Data
US 2023/0314185 A1    Oct. 5, 2023

(51) Int. Cl.
| | |
|---|---|
| *G01N 15/1434* | (2024.01) |
| *G01D 5/26* | (2006.01) |
| *G01J 9/02* | (2006.01) |
| *G06F 3/01* | (2006.01) |
| *G06F 3/03* | (2006.01) |
| *G06F 3/0354* | (2013.01) |

(52) U.S. Cl.
CPC ............ *G01D 5/266* (2013.01); *G01J 9/0246* (2013.01); *G01N 15/1434* (2013.01); *G06F 3/013* (2013.01); *G06F 3/0308* (2013.01); *G01J 2009/0288* (2013.01); *G01N 2015/1454* (2013.01); *G06F 3/03545* (2013.01)

(58) Field of Classification Search
None
See application file for complete search history.

(56) References Cited

U.S. PATENT DOCUMENTS

| | | | |
|---|---|---|---|
| 4,254,333 A | 3/1981 | Bergström |
| 4,468,131 A | 8/1984 | Bui et al. |
| 4,913,547 A | 4/1990 | Moran |
| 5,500,708 A | 3/1996 | Ohsawa |

(Continued)

FOREIGN PATENT DOCUMENTS

| | | |
|---|---|---|
| CN | 101592762 | 12/2009 |
| CN | 102109650 | 6/2011 |

(Continued)

OTHER PUBLICATIONS

Diao et al., "High-speed high-resolution heterodyne interferometer using a laser with low beat frequency," Applied Optics, vol. 55, No. 1, 2015, pp. 110-116.

*Primary Examiner* — Rufus L Phillips
(74) *Attorney, Agent, or Firm* — Brownstein Hyatt Farber Schreck, LLP

(57) ABSTRACT

An optical sensor module includes an interferometric sensor and a set of one or more optical elements. The interferometric sensor includes a coherent light source and at least one detector configured to generate an interferometric signal. The set of one or more optical elements is configured to simultaneously direct a first portion of light emitted by the coherent light source toward a first focus area within a first depth of focus; direct a second portion of the light emitted by the coherent light source toward a second focus area within a second depth of focus; and direct portions of the emitted light that are returned from one or more objects within the first depth of focus or the second depth of focus toward the interferometric sensor.

20 Claims, 13 Drawing Sheets

(56) References Cited

U.S. PATENT DOCUMENTS

| | | | |
|---|---|---|---|
| 5,565,986 A * | 10/1996 | Knuttel | G01J 9/02 |
| | | | 356/497 |
| 5,781,297 A | 7/1998 | Castore | |
| 5,825,465 A | 10/1998 | Nerin et al. | |
| 6,233,045 B1 | 5/2001 | Suni et al. | |
| 6,531,767 B2 | 3/2003 | Shrauger | |
| 6,724,486 B1 * | 4/2004 | Shull | H01S 3/109 |
| | | | 356/486 |
| 6,816,523 B1 | 11/2004 | Glenn et al. | |
| 6,872,931 B2 | 3/2005 | Liess et al. | |
| 7,139,446 B2 | 11/2006 | Slotwinski | |
| 7,184,445 B2 | 2/2007 | Guenter | |
| 7,277,180 B2 | 10/2007 | Townley-Smith et al. | |
| 7,336,368 B2 | 2/2008 | Liao et al. | |
| 7,366,217 B2 | 4/2008 | Guenter et al. | |
| 7,388,672 B2 | 6/2008 | Zhou et al. | |
| 7,509,050 B2 | 3/2009 | Ekkizogloy et al. | |
| 7,557,795 B2 | 7/2009 | Kong et al. | |
| 7,589,709 B2 | 9/2009 | Liess et al. | |
| 7,620,332 B2 | 11/2009 | Nishiyama | |
| 7,667,851 B2 | 2/2010 | Dubois et al. | |
| 7,675,020 B2 | 3/2010 | Machida | |
| 7,684,957 B2 | 3/2010 | Ueno | |
| 7,995,193 B2 | 8/2011 | Kuwata | |
| 8,174,597 B2 | 5/2012 | Ogasawara | |
| 8,208,814 B2 | 6/2012 | Sheth et al. | |
| 8,248,615 B2 | 8/2012 | Ueno | |
| 8,378,287 B2 | 2/2013 | Schemmann et al. | |
| 8,405,902 B2 | 3/2013 | Irie | |
| 8,416,424 B2 | 4/2013 | Werner et al. | |
| 8,444,331 B2 | 5/2013 | Kobayashi | |
| 8,446,592 B1 | 5/2013 | Arissian | |
| 8,529,460 B2 | 9/2013 | Kawano et al. | |
| 8,736,581 B2 | 5/2014 | Han et al. | |
| 8,751,091 B2 | 6/2014 | Moench et al. | |
| 8,781,687 B2 | 7/2014 | Han et al. | |
| 8,896,745 B2 | 11/2014 | Takachi | |
| 8,942,069 B2 | 1/2015 | Tortora | |
| 9,004,698 B2 | 4/2015 | Kilcher et al. | |
| 9,091,573 B2 | 7/2015 | Van Der Lee et al. | |
| 9,091,747 B2 | 7/2015 | Pruijmboom | |
| 9,146,304 B2 | 9/2015 | Land et al. | |
| 9,160,390 B2 | 10/2015 | Zhou et al. | |
| 9,420,155 B2 | 8/2016 | Brodie | |
| 9,459,352 B2 | 10/2016 | Becker et al. | |
| 9,588,586 B2 | 3/2017 | Rihn | |
| 9,648,221 B2 | 5/2017 | Seo et al. | |
| 9,658,113 B2 | 5/2017 | Bosch et al. | |
| 9,677,986 B1 | 6/2017 | Baldwin et al. | |
| 9,703,173 B2 | 7/2017 | Brodie | |
| 9,726,474 B2 | 8/2017 | Royo Royo et al. | |
| 9,772,398 B2 | 9/2017 | Bikumandla et al. | |
| 9,778,037 B2 | 10/2017 | Bestler | |
| 9,911,890 B2 | 3/2018 | Renard et al. | |
| 9,912,923 B2 | 3/2018 | Kilcher et al. | |
| 9,952,245 B2 | 4/2018 | Ueno | |
| 9,995,877 B2 | 6/2018 | Nakamura | |
| RE46,930 E | 7/2018 | Mimeault | |
| 10,070,799 B2 | 9/2018 | Ang et al. | |
| 10,184,783 B2 | 1/2019 | Flanders et al. | |
| 10,215,555 B2 | 2/2019 | Chen et al. | |
| 10,222,474 B1 | 3/2019 | Raring et al. | |
| 10,317,651 B2 | 6/2019 | Furutake et al. | |
| 10,379,028 B2 | 8/2019 | Spruit et al. | |
| 10,386,554 B2 | 8/2019 | Hjelmstrom et al. | |
| 10,492,679 B2 | 12/2019 | Zhou | |
| 10,503,048 B2 | 12/2019 | Del Bino et al. | |
| 10,555,079 B2 | 2/2020 | Bakish | |
| 10,613,625 B2 | 4/2020 | Huang et al. | |
| 10,614,295 B2 | 4/2020 | Kim et al. | |
| 10,635,800 B2 | 4/2020 | Bakish | |
| 10,581,474 B1 | 6/2020 | Fishman et al. | |
| 10,705,211 B2 | 7/2020 | Jacobs et al. | |
| 10,718,922 B2 | 7/2020 | Yong et al. | |
| 10,791,283 B2 | 9/2020 | Bardagjy et al. | |
| 10,824,275 B2 | 11/2020 | Mutlu et al. | |
| 10,845,873 B2 | 11/2020 | Huang | |
| 10,866,083 B2 | 12/2020 | Van Der Lee et al. | |
| 10,871,820 B2 | 12/2020 | Mutlu et al. | |
| 10,871,836 B2 | 12/2020 | Dashevsky | |
| 10,970,556 B2 | 4/2021 | Teich et al. | |
| 11,073,615 B2 | 7/2021 | Chua et al. | |
| 11,112,233 B2 | 9/2021 | Mutlu et al. | |
| 11,150,332 B1 | 10/2021 | Chen et al. | |
| 11,156,456 B2 | 10/2021 | Chen et al. | |
| 11,157,113 B2 | 10/2021 | Winkler et al. | |
| 11,175,700 B1 | 11/2021 | Poole | |
| 11,243,068 B1 | 2/2022 | Mutlu et al. | |
| 11,243,686 B2 | 2/2022 | McCord | |
| 11,280,714 B2 | 3/2022 | Momtahan et al. | |
| 11,494,926 B1 | 11/2022 | Wu | |
| 11,822,095 B2 | 11/2023 | Park et al. | |
| 2005/0156874 A1 | 7/2005 | Kong | |
| 2005/0157971 A1 | 7/2005 | Juijve et al. | |
| 2006/0239312 A1 | 10/2006 | Kewitsch et al. | |
| 2008/0007713 A1 | 1/2008 | Zijp | |
| 2008/0123106 A1 | 5/2008 | Zeng et al. | |
| 2009/0002829 A1 | 1/2009 | Shinohara | |
| 2011/0126617 A1 | 6/2011 | Bengoechea Apezteguia et al. | |
| 2011/0222051 A1 * | 9/2011 | Heng | G01N 15/147 |
| | | | 356/73 |
| 2011/0267467 A1 | 11/2011 | Kimura et al. | |
| 2011/0301455 A1 * | 12/2011 | Numajiri | G01B 9/02027 |
| | | | 600/425 |
| 2012/0262722 A1 * | 10/2012 | Lim | G01B 9/02091 |
| | | | 356/479 |
| 2012/0281221 A1 | 11/2012 | Studer et al. | |
| 2014/0293055 A1 | 10/2014 | Otsuka | |
| 2015/0309568 A1 | 10/2015 | Miki | |
| 2016/0021285 A1 | 1/2016 | Nadler et al. | |
| 2017/0090599 A1 | 3/2017 | Kuboyama et al. | |
| 2017/0192133 A1 | 7/2017 | Murakami et al. | |
| 2017/0343817 A1 | 11/2017 | Bietry et al. | |
| 2018/0073924 A1 | 3/2018 | Steinmann et al. | |
| 2018/0081434 A1 | 3/2018 | Siddiqui et al. | |
| 2019/0146065 A1 | 5/2019 | Jutte et al. | |
| 2019/0317454 A1 | 10/2019 | Holenarsipur et al. | |
| 2019/0319157 A1 | 10/2019 | Coffy et al. | |
| 2019/0391539 A1 | 12/2019 | Perkins et al. | |
| 2020/0072740 A1 | 3/2020 | Venturini et al. | |
| 2020/0103274 A1 | 4/2020 | Garrett et al. | |
| 2020/0192152 A1 * | 6/2020 | Jamali | G02B 27/0093 |
| 2020/0200522 A1 | 6/2020 | Huang et al. | |
| 2020/0309661 A1 | 10/2020 | Spruit et al. | |
| 2020/0370879 A1 | 11/2020 | Mutlu et al. | |
| 2021/0003385 A1 | 1/2021 | Tan et al. | |
| 2021/0011559 A1 | 1/2021 | Mutlu et al. | |
| 2021/0015350 A1 | 1/2021 | Butte et al. | |
| 2021/0104873 A1 | 4/2021 | Gerlach | |
| 2021/0116355 A1 | 4/2021 | Spruit et al. | |
| 2021/0294489 A1 | 9/2021 | Li et al. | |
| 2022/0003543 A1 | 1/2022 | Chen et al. | |
| 2022/0074844 A1 * | 3/2022 | D'Apuzzo | G01J 3/0208 |
| 2022/0099436 A1 | 3/2022 | Chen et al. | |
| 2022/0155052 A1 | 5/2022 | Mutlu et al. | |
| 2022/0202515 A1 | 6/2022 | Itkowitz et al. | |
| 2022/0244041 A1 | 8/2022 | Shou et al. | |
| 2022/0404138 A1 | 12/2022 | Mutlu et al. | |
| 2023/0087691 A1 | 3/2023 | Chen et al. | |
| 2023/0366672 A1 | 11/2023 | Huang et al. | |
| 2024/0003671 A1 | 1/2024 | Jin et al. | |
| 2024/0004034 A1 | 1/2024 | Chen et al. | |

FOREIGN PATENT DOCUMENTS

| | | | |
|---|---|---|---|
| CN | 105223579 | | 1/2016 |
| CN | 107564924 | | 1/2018 |
| CN | 108225543 | | 6/2018 |
| CN | 108692663 | | 4/2020 |
| EP | 3598591 | | 1/2020 |
| EP | 3796140 | | 3/2021 |
| GB | 2443662 | | 5/2008 |
| JP | 2004504634 | * | 2/2004 |
| JP | 2005528682 | | 9/2005 |

(56) References Cited

FOREIGN PATENT DOCUMENTS

| | | |
|---|---|---|
| JP | 2009222573 | 10/2009 |
| JP | 2010526315 | 7/2010 |
| JP | 2011523700 | 8/2011 |
| JP | 2012521003 | 9/2012 |
| JP | 2013508717 | 3/2013 |
| JP | 2014078823 | 5/2014 |
| JP | 2014534459 | 12/2014 |
| JP | 2015078946 | 4/2015 |
| JP | 2019515258 | 6/2019 |
| JP | 2019121691 | 7/2019 |
| WO | WO 05/013517 | 2/2005 |
| WO | WO 09/156937 | 12/2009 |
| WO | WO 10/139144 | 12/2010 |
| WO | WO 12/049561 | 4/2012 |
| WO | WO 17/178711 | 10/2017 |
| WO | WO 18/036685 | 3/2018 |
| WO | WO 19/015623 | 1/2019 |
| WO | WO 19/042953 | 3/2019 |

\* cited by examiner

OPTICAL SENSOR MODULE INCLUDING AN INTERFEROMETRIC SENSOR AND EXTENDED DEPTH OF FOCUS OPTICS

FIELD

The described embodiments generally relate to devices that include interferometric sensors, such as self-mixing interferometry (SMI) sensors or Mach-Zender interferometers, and to devices that use such sensors to sense various physical phenomena (e.g., presence, distance, velocity, size, surface properties, or particle count).

BACKGROUND

Sensor systems are included in many of today's electronic devices, including electronic devices such as smartphones, computers (e.g., tablet computers or laptop computers), wearable electronic devices (e.g., electronic watches or health monitors), game controllers, or navigation systems (e.g., vehicle navigation systems or robot navigation systems). Sensor systems may variously sense phenomena such as the presence of objects, distances to objects or proximities of objects, movements of objects (e.g., whether objects are moving, or the speed, acceleration, or direction of movement of objects), or properties of objects.

Given the wide range of sensor system applications, any new development in the configuration or operation of a sensor system can be useful. New developments that may be particularly useful are developments that reduce the cost, size, complexity, part count, or manufacture time of the sensor system; or developments that improve the sensitivity, range, speed, or of sensor system operation; or developments that increase the range of applications for a sensor system.

SUMMARY

Embodiments of the systems, devices, methods, and apparatus described in the present disclosure are directed to the configuration and operation of an optical sensor module that includes an interferometric sensor and extended depth of focus optics. The interferometric sensor may include an SMI sensor or a Mach-Zender interferometer. The extended depth of focus optics may include a set of one or more optical elements that focus the light emitted by a coherent light source of an interferometric sensor toward different focus areas within different depths of focus. The different depths of focus may be overlapping or non-overlapping depths of focus. As defined herein, a depth of focus (DoF) is a distance range, from a set of one or more optical elements, within which the statistical signal strength distribution of an interferometric signal produced by an interferometric sensor meets sensing signal-to-noise ratio (SNR) and detection failure rate requirements.

In a first aspect, the present disclosure describes an optical sensor module. The optical sensor module may include an interferometric sensor and a set of one or more optical elements. The interferometric sensor may include a coherent light source and at least one detector configured to generate an interferometric signal. The set of one or more optical elements may be configured to simultaneously direct a first portion of light emitted by the coherent light source toward a first focus area within a first depth of focus; direct a second portion of the light emitted by the coherent light source toward a second focus area within a second depth of focus; and direct portions of the emitted light that are returned from one or more objects within the first depth of focus or the second depth of focus toward the interferometric sensor.

In another aspect of the disclosure, the present disclosure describes a hand-held input device. The hand-held input device may include an elongate housing having a surface contact end; a set of one or more interferometric sensors mounted to the elongate housing and configured to emit light; a set of one or more optical elements; and a processor. The set of one or more optical elements may be configured to, for an interferometric sensor in the set of one or more interferometric sensors, direct a first portion of the emitted light toward a first focus area within a first depth of focus near the surface contact end of the housing; direct a second portion of the emitted light toward a second focus area within a second depth of focus near the surface contact end of the housing; and direct portions of the emitted light returned from one or more objects, in the first depth of focus or the second depth of focus, toward the interferometric sensor. The processor may be mounted within the elongate housing and configured to identify an input provided by a user on a surface contacted by the surface contact end of the housing, the input identified at least in part based on a set of one or more interferometric signals generated by the set of one or more interferometric sensors.

In another aspect, the present disclosure describes a wearable device. The wearable device may include a wearable housing; a set of one or more interferometric sensors mounted to the wearable housing and configured to emit light from the wearable housing; and a set of one or more optical elements. The set of one or more optical elements may be configured to, for an interferometric sensor in the set of one or more interferometric sensors, direct a first portion of the emitted light toward a first focus area within a first depth of focus; direct a second portion of the emitted light toward a second focus area within a second depth of focus; and direct portions of the emitted light returned from a surface toward the interferometric sensor.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
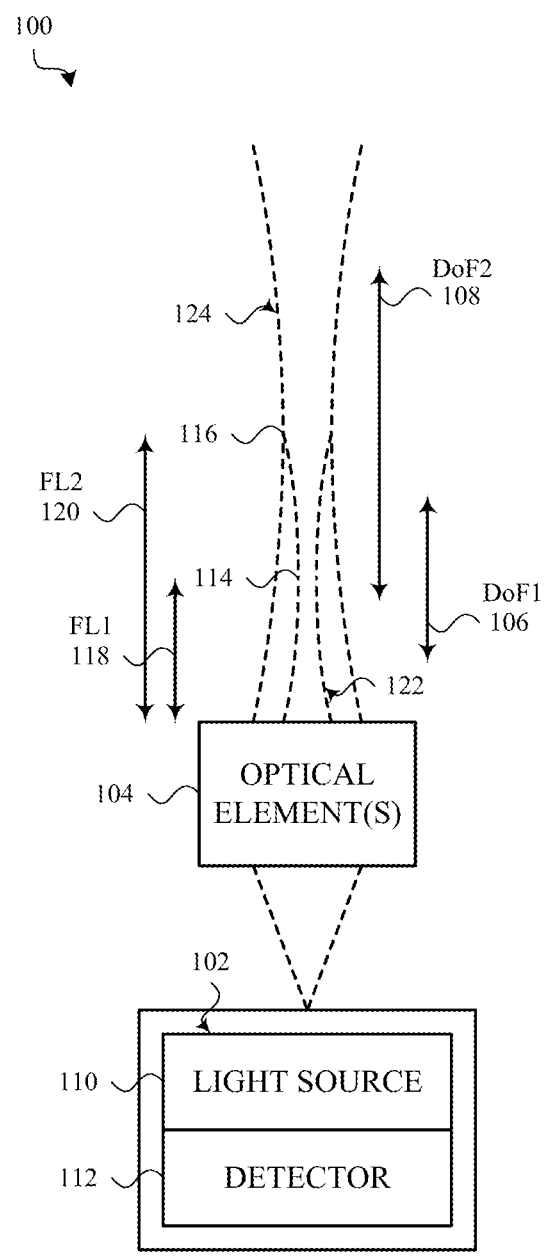
FIG. 1 shows a block diagram of an example first optical sensor module having an extended depth of focus.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Coherent optical sensing, including Doppler velocimetry and heterodyning, can be used to obtain spatial information for an object or target. Example spatial information includes presence, distance, velocity, size, surface properties, and particle count. Coherent optical sensing can sometimes be used to obtain spatial information for a target with optical wavelength resolution, at quantum limit signal levels, and with considerably lower photon energy than time-of-flight optical sensing methods. Coherent optical sensing can also limit interference from external aggressors such as ambient light or light generated by light sources of other optical sensing systems.

A semiconductor light source integrated with a wafer-level or wafer-bonded photodetector enables coherent optical sensing (e.g., interferometric sensing) using a monolithic sensor structure. Examples of semiconductor light sources that can be integrated with a photodetector include vertical cavity surface-emitting lasers (VCSELs), edge-emitting lasers (EELs), horizontal cavity surface-emitting lasers (HC-SELs), vertical external-cavity surface-emitting lasers (VECSELs), quantum-dot lasers (QDLs), quantum cascade lasers (QCLs), and light-emitting diodes (LEDs) (e.g., organic LEDs (OLEDs), resonant-cavity LEDs (RC-LEDs), micro LEDs (mLEDs), superluminescent LEDs (SLEDs), and edge-emitting LEDs). These light sources may also be referred to as coherent light sources. A semiconductor light source may be integrated with a photodetector in an intra-cavity, stacked, or adjacent photodetector configuration.

Two common types of interferometric sensors are an SMI sensor and a Mach-Zender interferometer. An SMI sensor is defined herein as a sensor that is configured to generate and emit light from a resonant cavity of a semiconductor light source, receive a reflection or backscatter of the light (e.g., light reflected or backscattered from an object) back into the resonant cavity, coherently or partially coherently self-mix the generated and reflected/backscattered light within the resonant cavity, and produce an output indicative of the self-mixing (i.e., an SMI signal). The generated, emitted, and received light may be coherent or partially coherent, but a semiconductor light source capable of producing such coherent or partially coherent light may be referred to herein as a coherent light source. The generated, emitted, and received light may include, for example, visible or invisible light (e.g., green light, infrared (IR) light, or ultraviolet (UV) light). The output of an SMI sensor (i.e., the SMI signal) may include a photocurrent produced by a photodetector (e.g., a photodiode). Alternatively or additionally, the output of an SMI sensor may include a measurement of a current or junction voltage of the SMI sensor's semiconductor light source.

A general target of interest for interferometric sensing, including SMI sensing, would be a non-smooth target and/or target having a volume that can be penetrated by light, such as a person's skin, clothes, a table-top, a wall, or the ground. The light that is emitted by a semiconductor light source to illuminate such a target will typically backscatter into a larger range of solid angles than a cone of incident angles, such that only a small fraction of the power of the emitted light will be reflected within the cone of incident angles and received back into the resonant cavity of the semiconductor light source in a retro-reflective fashion (i.e., as feedback). Typically, the lens system associated with an SMI sensor will have a tight focus, to maximize the feedback collection cone and the feedback power level via increasing object-space (or target-space) numerical aperture (NA). However, this inevitably results in a shallower depth of focus (DoF).

The DoF of an SMI system is a distance range, from a set of one or more optical elements, within which the statistical signal strength distribution of an interferometric signal produced by an SMI sensor meets sensing SNR and detection failure rate requirements. Due to the speckle from multiple back-scatterer interferences, SMI signal strength per detection is a probability (for example, a Rayleigh distribution)

around a main value. Although the mean value SMI signal strength at focus can be high, for example 20 dB above an SNR threshold, it can fade quickly out of focus due to a drop of feedback level. A typical value would have a distribution mean fading of −5 dB over 100 um, or −10 dB over 200 um, out of focus for a moderate image-side NA of 0.1. With this mean signal strength drop when out of focus, the distribution of SMI signal strength per detection drops accordingly, and a higher portion of detection events will be below the SNR threshold and either create detection error/failures, or force that the detection events be dropped to avoid detection error/failure.

In typical free-space SMI sensing applications, and even for certain enclosed SMI sensing applications, the target distance at which it is desired to detect or characterize an object can vary significantly. For example, a free-space particle tracking application may have a DoF that is 10-20% of the working distance. A digital pencil-like surface tracking application may require a DoF of 50% or more of the working distance, due to the geometric variation between the digital pencil and a surface. The native DoF for a single focus high NA SMI sensor system is typically <1%, <2% or <5% of the target-space working distance, depending on the specific system operating envelope and SNR budget. The gap in DoF for such an application may be covered by multiple SMI sensors having different focal lengths, by a single SMI system having a tunable focus, or by a single SMI system having an extended DoF. The last option may have the lowest system cost, and various embodiments of such a system are described herein.

Described herein are optical sensor modules having extended depth of focus optics. In some embodiments, the extended depth of focus optics may take the form of a set of one or more optical elements that direct the light emitted by one or more interferometric sensors toward two or more focus areas within two or more respective depths of focus, and also direct a portion of the light that is returned from object(s) within the multiple depths of focus toward the interferometric sensor(s). For example, a set of one or more optical elements may receive the light emitted by an interferometric sensor and direct different portions of the emitted light toward different focus areas within different depths of focus. As another example, a set of one or more optical elements may receive the light emitted by two or more interferometric sensors and direct the light received from different interferometric sensors toward different focus areas within different depths of focus. As defined herein, a focus area may be a focus point or a smallest optical beam size of an optical beam (e.g., in embodiments where an optical beam is not focused to a discrete focal point).

In some of the described modules, each focus can be designed to have its own pre-designed target-side NA, or target-side collection solid angle, based on a segmented/fractional phase distribution, to ensure similar peak signal strengths for different focus areas. The NA and focus length may be designed such that the depths of field associated with different focus areas overlap, and the combined signal strength in an overlap region, together with the peak signal strength for the different focus areas, are all above a system SNR threshold. The segmented/fractional phase distribution can also provide uniform or other desirable features across an extended depth of focus, such as a uniform speckle size and/or speckle correlation length.

Different foci and depths of focus may be applied spatially, such that a full extended depth of focus over a large target distance may be provided at any time, at the cost of optical sensor module power consumption, or temporally (more dynamically), such that a particular single depth of focus, or subset of depths of focus, can be provided at a particular time. In these latter embodiments, different depths of focus (or different subsets of depths of focus) can be selected according to a target sensing position or sensing application. Such switching between different depths of focus can be realized by switching between interferometric sensors having different polarizations, beam pointing, and other beam quality degrees of freedom.

The optical sensor modules described herein may provide uniform sensing performance, a consistent and enhanced user experience over an extended target distance, and/or support for multiple different sensing applications.

These and other techniques are described with reference to FIGS. 1-16. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "above", "below", "left", or "right" is used with reference to the orientation of some of the components in some of the figures described below. Because components in various embodiments can be positioned in a number of different orientations, directional terminology is used for purposes of illustration only and is usually not limiting. The directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

FIG. 1 shows a block diagram of an example first optical sensor module 100 having an extended depth of focus. The optical sensor module 100 may include an interferometric sensor 102 and a set of one or more optical elements 104. The optical sensor module 100 may be used to detect the presence and/or characteristics of one or more objects within a first depth of focus 106 and/or a second depth of focus 108. The first and second depths of focus 106, 108 (DoF1, DoF2) may be overlapping, as shown. Alternatively, the first and second depths of focus may be disjoint. A detected object need only be within one of the depths of focus 106, 108, but in some cases may be within an overlapping region of both depths of focus 106, 108.

The interferometric sensor 102 may have various configurations, and in some embodiments may include a coherent light source 110 and at least one detector 112. The coherent light source 110 may include a laser or an LED in some embodiments. The at least one detector 112 may include at least one opto-electronic detector or at least one electrical detector. The at least one detector 112 may be configured to generate an interferometric signal.

In some embodiments, the interferometric sensor 102 may take the form of an SMI sensor or a Mach-Zender interferometer. Examples of these sensors are described with reference to FIGS. 11 and 12.

In the case of an SMI sensor, the coherent light source 110 may emit light that impinges on and passes through the optical element(s) 104. In the case of multiple optical elements 104, a particular emitted photon may pass through all or only some of the optical elements 104. Emitted light that passes through the optical element(s) 104 may impinge on one or more objects and be returned (e.g., scattered or reflected) from the object(s) toward the optical element(s) 104. For a diffusive object, the returned light may be a relatively small percentage of the emitted light. The light returned toward the optical element(s) 104 may pass through the optical element(s) 104 and be received back into the coherent light source 110, where generated light may self-mix (or interfere) with the returned light. The mixed light may be sensed by an opto-electronic detector that generates an interferometric signal (i.e., an SMI signal). The opto-electronic detector may include a photodetector that is integrated with (e.g., in, stacked with, or adjacent to) the coherent light source 110. Additionally or alternatively, an interferometric signal (i.e., an SMI signal) can be detected electrically by monitoring fluctuations in a junction voltage or drive current of the coherent light source 110, which fluctuations are caused by the self-mixing of light within the coherent light source 110. The SMI signal, regardless of how generated, may have characteristics that indicate when an object is present within the first and/or second depth of focus 106, 108. The SMI signal may also have characteristics that indicate a speed, direction, direction of rotation, position, size, and/or other parameters of the object(s) within the first and/or second depth of focus. Objects outside the depth of focus 106, 108 may also affect the SMI signal, but in ways that may not enable reliable detection of characterization of the objects (e.g., because the manner in which they affect the SMI signal are not distinguishable, or consistently distinguishable, from noise).

In the case of a Mach-Zender interferometer, the coherent light source 110 may emit light that impinges on a beam splitter, such as a partially transmissive mirror. A first portion of the split beam may be directed toward an optical mixer, and a second portion of the split beam may be directed toward the optical element(s) 104 and impinge on the optical element(s) 104. In the case of multiple optical elements 104, a particular emitted photon may pass through all or only some of the optical elements 104. Emitted light that passes through the optical element(s) 104 may impinge on one or more objects and be returned (e.g., scattered or reflected) from the object(s) toward the optical element(s) 104. For a diffusive object, the returned light may be a relatively small percentage of the emitted light. The light returned toward the optical element(s) 104 may pass through the optical element(s) 104 and be received at the optical mixer, where the emitted light in the first portion of the split beam is mixed (or interfered) with the returned light. The mixed light may be sensed by an opto-electronic detector (e.g., a photodetector) that generates an interferometric signal. The interferometric signal may have characteristics that indicate when an object is present within the first and/or second depth of focus 106, 108. The interferometric signal may also have characteristics that indicate a speed, direction, direction of rotation, position, size, and/or other parameters of the object(s) within the first and/or second depth of focus. In an alternative Mach-Zender interferometer, the mixed light may be detected by a balanced pair of detectors (e.g., a pair of photodetectors), and outputs of the detectors may be compared or combined to generate an interferometric signal.

Figure 6:
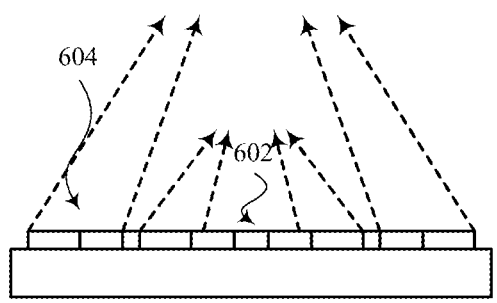
FIG. 6 shows an elevation of a fourth example optical element, having a diffractive structure, that may be used in the optical sensor module shown in FIG. 1.
Figure 7:
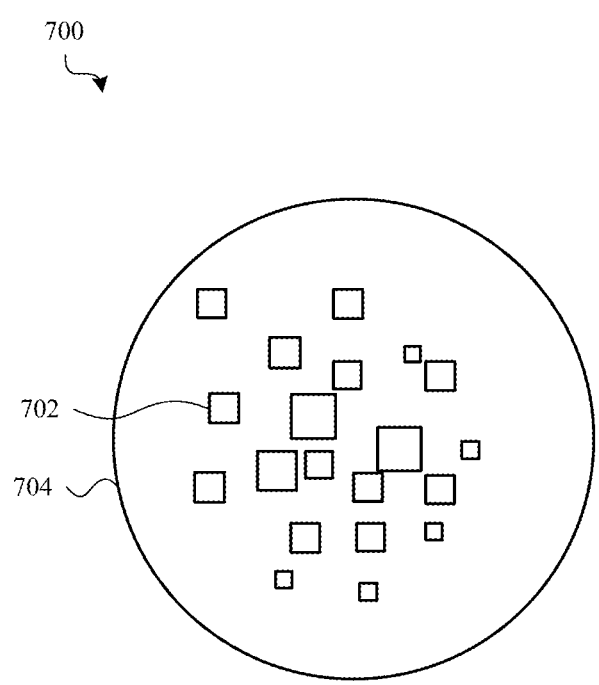
FIG. 7 shows a plan view of a fifth example optical element, having a first set of zones and at least a second zone, that may be used in the optical sensor module shown in FIG. 1.
Figure 8:
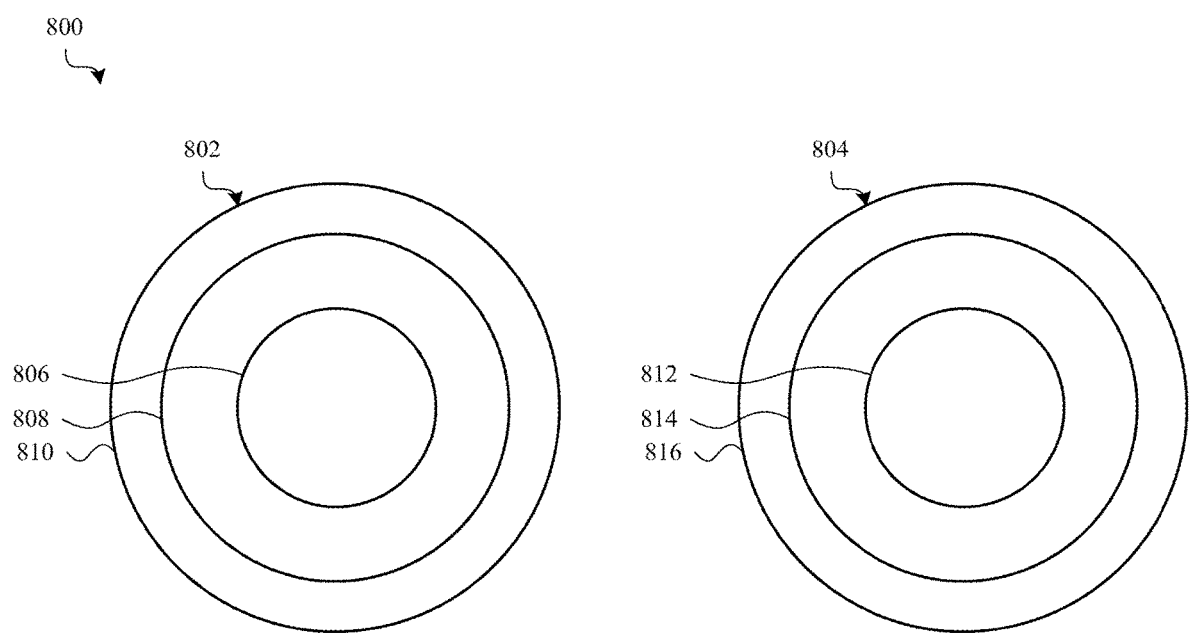
FIG. 8 shows a plan view of an example set of one or more optical elements that may be used in the optical sensor module shown in FIG. 1.

The set of one or more optical elements 104 may include a singular optical element (e.g., a zone plate or phase plate, as described for example with reference to FIGS. 3-7, a lens, or another type of optical element) or multiple optical elements (e.g., a stack of two or more optical elements, as described for example with reference to FIG. 8). The set of one or more optical elements 104 may also include separate side-by-side optical elements. The optical element(s) 104 may be configured to contemporaneously (i.e., simultaneously or in an alternating and repeated way within a time period) or simultaneously direct a first portion of light emitted by the coherent light source 110 toward a first focus area 114 within the first depth of focus 106, as optical beam 122, and direct a second portion of the light emitted by the coherent light source 110 toward a second focus area 116 of the second depth of focus 108, as optical beam 124. The first focus area 114 is at a first focal length 118 (FL1) from the optical element(s) 104, and the second focus area 116 is at a second focal length 120 (FL2) from the optical element(s) 104. The optical element(s) 104 may also direct portions of the emitted light that are returned from one or more objects within the first or second depth of focus 106, 108 toward the interferometric sensor 102.

The optical sensor module 100 may be used to detect objects within the first depth of focus 106 and/or objects within the second depth of focus 108. For example, the optical sensor module 100 may detect an object that is solely within the first depth of focus 106, an object that is solely within the second depth of focus 108, and/or (when the first and second depths of focus 106, 108 overlap) an object that is within both the first and second depths of focus 106, 108. The optical sensor module 100 may also detect multiple objects within the first and/or second depth of focus 106, 108. Each object will return the emitted light in a different way, leading to different perturbations (or characteristics) in the interferometric signal generated by the at least one detector 112.

In some embodiments, the optical sensor module 100 may have one or more additional depths of focus (e.g., one or more of a third depth of focus, a fourth depth of focus, etc.). The additional depth(s) of focus may or may not overlap the first or second depth of focus 106, 108.

Figure 2:
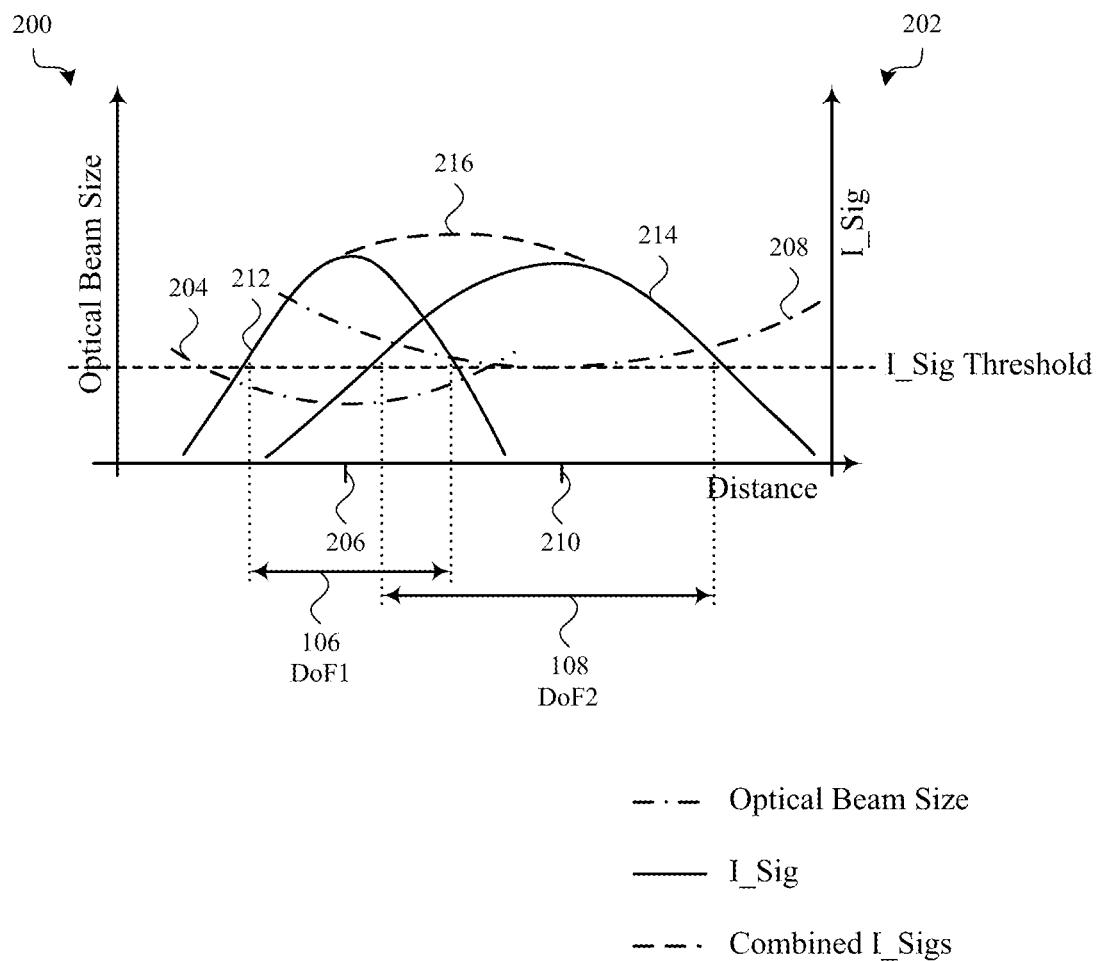
FIG. 2 graphically illustrates the extended depth of focus of the optical sensor module shown in FIG. 1.

FIG. 2 graphically illustrates the extended depth of focus of the optical sensor module 100 described with reference to FIG. 1. Shown in FIG. 2 are two superimposed graphs 200, 202. The first graph 200 is a graph of optical beam size (along the left y-axis) versus distance (along the x-axis). The optical beam size may be a width, perimeter, or cross-sectional area of an optical beam (or the diameter, if the optical beam has a circular cross-section). The distance graphed along the x-axis is a distance from the set of one or more optical elements 104. The second graph 202 is a graph of signal strength (I_Sig, along the right y-axis) versus distance (along the x-axis). The signal strength represents a maximum signal strength returned to the coherent light source 110 from objects at different distances.

The first graph 200 shows a first beam size 204 of the first portion of light emitted by the coherent light source 110. The first portion of light is directed toward the first focus area 114 within the first depth of focus 106. The first beam size 204 has a beam waist position 206 (i.e., a distance from the set of one or more optical elements 104 at which the first beam size 204 is at a minimum) at the first focus area 114. The first graph 200 also shows a second beam size 208 of the second portion of light emitted by the coherent light source 110. The second portion of light is directed toward the second focus area 116 within the second depth of focus 108. The second beam size 208 has a beam waist position 210 at the second focus area 116.

The second graph 202 shows a first curve 212, corresponding to a statistical signal strength level (e.g., a mean, or a particular percentile of signal strength statistics over speckle) returned to the coherent light source 110 when the first portion of the light emitted by the coherent light source 110 is returned from an object at different distances. The first curve 212 peaks at the beam waist position 206 of the first beam size 204. The second graph 202 also shows a second curve 214, corresponding to a statistical signal strength level returned to the coherent light source 110 when the second portion of the light emitted by the coherent light source 110 is returned from an object at different distances. The second curve 214 peaks at the beam waist position 210 of the second beam size 208.

The first depth of focus 106 can be defined as a width of the first curve 212 at a detectable level of I_sig (i.e., a level of I_Sig that is sufficiently above a noise threshold, I_Sig Threshold). The second depth of focus 108 can be defined as a width of the second curve 214 at a detectable level of I_sig (i.e., a level of I_Sig that is sufficiently above the noise threshold, I_Sig Threshold). As shown in the graph 202, the first and second depths of focus 106, 108 overlap. In other embodiments, the first and second depths of focus may not overlap. In some embodiments, the optical sensor module 100 may be designed such that the intensities of the curves 212 and 214 constructively combine (e.g., add) to form a curve 216 in the region where the first and second depths of focus 106, 108 overlap.

Figure 3:
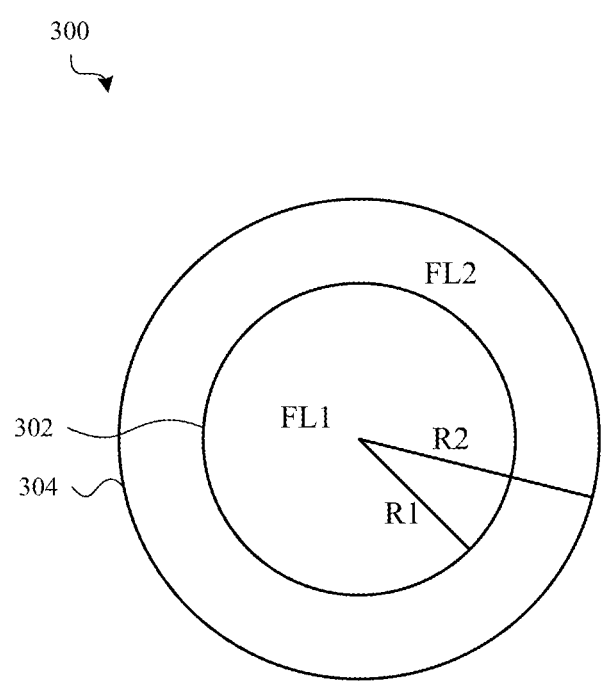
FIG. 3 shows a plan view of a first example optical element, having first and second zones for directing light, that may be used in the optical sensor module shown in FIG. 1.

FIG. 3 shows a plan view of a first example optical element 300. The optical element 300 may be used as the sole optical element, or one optical element, in the set of one or more optical elements described with reference to FIG. 1.

By way of example, the optical element 300 is shown to be a zone plate (or phase plate) having a circular perimeter, although alternative embodiments could have perimeters that are oval, square, rectangular or otherwise-shaped. In some embodiments, the perimeter of the optical element 300 may be shaped similarly to the optical beam size of an optical beam that passes through the optical element 300. In other embodiments, the perimeter may not be shaped similarly to the optical beam size of an optical beam that passes through the optical element 300. The zone plate may have a first zone 302 and a second zone 304. In alternative embodiments, the zone plate may have additional zones.

Also by way of example, the first zone 302 is shown to be surrounded by the second zone 304, with the second zone 304 being a concentric ring around the first zone 302. Additional zones may be formed as additional concentric rings around the second zone 304. The first zone 302 may direct a first portion of the light received at a first side of the optical element 300 toward a first focus area of a first depth of focus, and the second zone 304 may direct a second portion of the light received at the first side toward a second focus area of a second depth of focus. In some embodiments, the first focus area, first depth of focus, second focus area, and second depth of focus may be the first focus area, first depth of focus, second focus area, and second depth of focus described with reference to FIG. 1.

In some embodiments, the first zone 302 may have a first radius (R1) and a first focal length (FL1). Similarly, the second zone 304 may have a second radius (R2−R1) and a second focal length (FL2). To ensure that equal amounts of received light are directed toward the first and second focus areas, the zone plate may be manufactured under the following design considerations:

$$R2/FL2 = R1/FL1$$

$$NA2 = NA1$$

$$R1^2 = R2^2 - R1^2$$

$$R2 = 1.4R1$$

where NA1 is the object-space numerical aperture of the first zone 302, and NA2 is the object-space numerical aperture of the second zone 304.

In some embodiments, the first zone 302 may be configured with a first phase and the second zone 304 may be configured with a second phase, such that the first phase and the second phase constructively interfere in a far field overlap of light passing through the first and second zones 302, 304. Constructive interference can be especially useful to handle speckle (i.e., a pattern of light and dark regions on an aperture of a coherent light source). When light scatters off of a rough or diffuse object, the scattered light has a speckle pattern. When the light that scatters off of objects in two different focus areas or depths of focus has different speckle patterns, the speckle patterns may constructively and/or destructively interfere as they combine at an aperture of a coherent light source. By configuring the first and second phases of the first and second zones 302, 304 to constructively interfere (across focus areas and depths of focus), constructive interference can be assured, and a reduction in SNR can be avoided.

Figure 4:
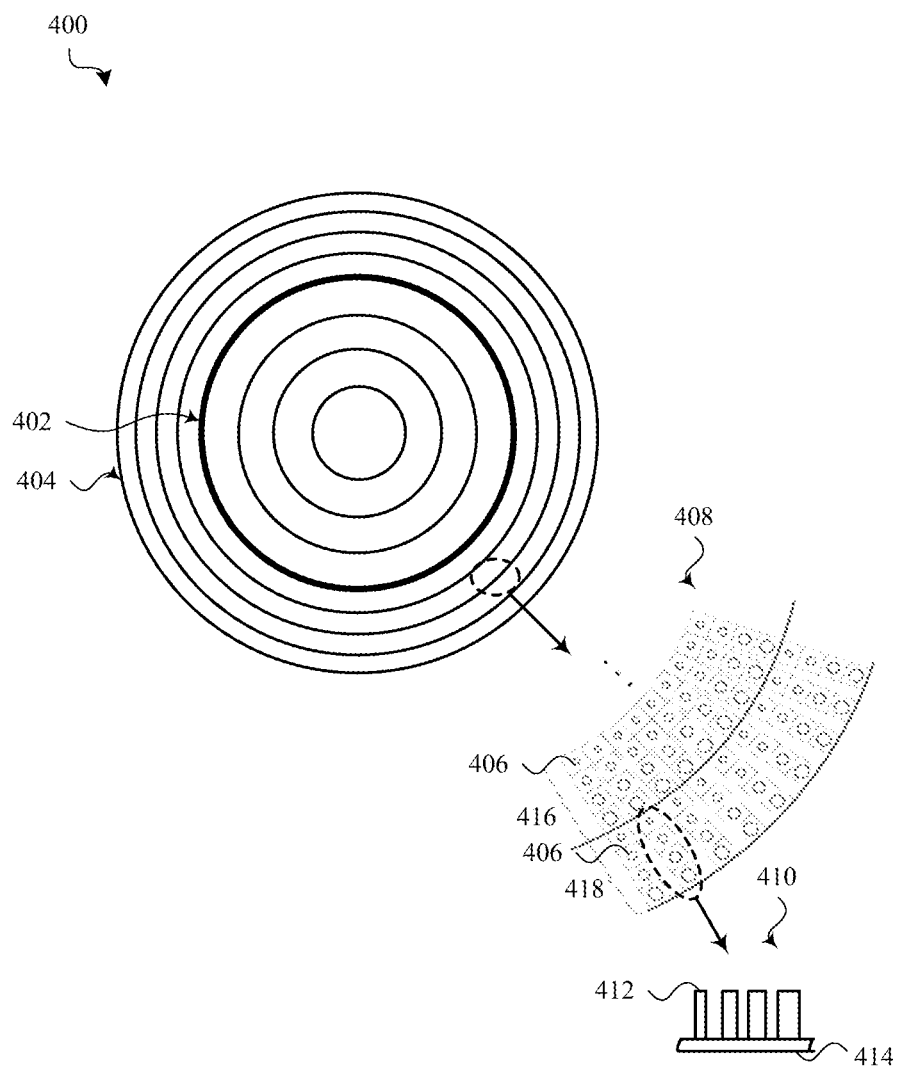
FIG. 4 shows a plan view and elevation of a second example optical element, having a meta-surface, that may be used in the optical sensor module shown in FIG. 1.

FIG. 4 shows a plan view and elevation of a second example optical element 400. The optical element 400 may be used as the sole optical element, or one optical element, in the set of one or more optical elements described with reference to FIG. 1.

By way of example, the optical element 400 is shown to be a zone plate (or phase plate) having a circular perimeter, although alternative embodiments could have perimeters that are oval, square, rectangular or otherwise-shaped. In some embodiments, the perimeter of the optical element 400 may be shaped similarly to the optical beam size of an optical beam that passes through the optical element 400. In other embodiments, the perimeter may not be shaped similarly to the optical beam size of an optical beam that passes through the optical element 400. The zone plate may have a first zone 402 and a second zone 404, which may be positioned/located as described with reference to FIG. 3. In alternative embodiments, the zone plate may have additional zones.

The first zone 402 may direct a first portion of the light received at a first side of the optical element 400 toward a first focus area of a first depth of focus, and the second zone 404 may direct a second portion of the light received at the first side toward a second focus area of a second depth of focus. In some embodiments, the first focus area, first depth of focus, second focus area, and second depth of focus may be the first focus area, first depth of focus, second focus area, and second depth of focus described with reference to FIG. 1.

The first and second zones 402, 404 may be defined, at least in part, by a meta-surface. The meta-surface may have structures 406 such as holes or pillars formed of a material (or materials) having a different refractive index than a surrounding material. For example, the structures 406 may in some embodiments include a first material embedded in a second material, or holes within a base material, or pillars surrounded by air. The structures 406 may have different dimensions and/or spacings, as shown in exploded plan view 408 and exploded elevation 410. By way of example, the structures 406 may be nanopillars having different diameters and/or spacings. The structures 406 may extend from a primary surface 412 toward a secondary surface 414, and may extend partially through or entirely through the optical element 400. The dimensions and/or spacings of the structures 406 may change the phase of light passing through the meta-surface, and may be bend or otherwise alter the direction of received light to direct the light toward the first focus area or the second focus area.

In alternative embodiments, the meta-surface may be replaced or supplemented with a meta-structure that does not extend to a surface of the optical element 400.

An advantage of the optical element 400 is that it may be formed with two, flat, planar surfaces, making it easy to stack, position, or mount relative to other components. It can also typically be made thinner than an optical element having an uneven surface.

In some alternative embodiments, the first and second zones 402, 404 may be subdivided into a first set of zones and a second set of zones. In these embodiments, the first and second sets of zones may be interspersed. For example, alternating ones of the rings shown in FIG. 4 (e.g., rings 416 and 418) may correspond to the first set of zones or the second set of zones.

Figure 5:
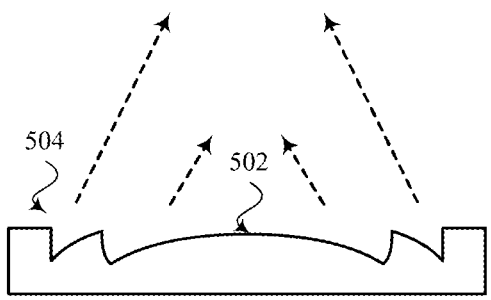
FIG. 5 shows an elevation of a third example optical element, having a refractive structure, that may be used in the optical sensor module shown in FIG. 1.

FIG. 5 shows an elevation of a third example optical element 500. The optical element 500 may be used as the sole optical element, or one optical element, in the set of one or more optical elements described with reference to FIG. 1. In some embodiments, the optical element 500 may be an example of the optical element described with reference to FIG. 3, with first and second zones 502, 504 being defined by a refractive structure (e.g., a molded Fresnel lens).

FIG. 6 shows an elevation of a fourth example optical element 600. The optical element 600 may be used as the sole optical element, or one optical element, in the set of one or more optical elements described with reference to FIG. 1. In some embodiments, the optical element 600 may be an example of the optical element described with reference to FIG. 3, with first and second zones 602, 604 being defined by a diffractive structure or a gradient index (GRIN) lens.

FIG. 7 shows a plan view of a fifth example optical element 700. The optical element 700 may be used as the sole optical element, or one optical element, in the set of one or more optical elements described with reference to FIG. 1. By way of example, the optical element 700 is shown to be a zone plate (or phase plate) having a circular perimeter, although alternative embodiments could have perimeters that are oval, square, rectangular or otherwise-shaped. In some embodiments, the perimeter of the optical element 700 may be shaped similarly to the optical beam size of an optical beam that passes through the optical element 700. In other embodiments, the perimeter may not be shaped similarly to the optical beam size of an optical beam that passes through the optical element 700. The zone plate may have a first set of zones 702 and at least a second zone 704. In alternative embodiments, the zone plate may have additional zones.

Also by way of example, the first set of zones 702 is shown to be dispersed within the second zone 704. The first set of zones 702 may have square perimeters, rectangular perimeters, or perimeters of other shapes. The first set of zones 702 may have same-sized or differently-sized zones 702, and may also have same-shaped or differently-shaped zones 702. Additional zones may be formed as additional sets of zones dispersed within the second zone 704, as one or more concentric rings around the second zone 704, or in other ways. The first set of zones 702 may direct a first portion of the light received at a first side of the optical element 700 toward a first focus area of a first depth of focus, and the second zone 704 may direct a second portion of the light received at the first side toward a second focus area of a second depth of focus. In some embodiments, the first focus area, first depth of focus, second focus area, and second depth of focus may be the first focus area, first depth of focus, second focus area, and second depth of focus described with reference to FIG. 1.

In some embodiments, the optical element 700 may include a meta-surface that defines the first set of zones 702 and the second zone 704. In some embodiments, the optical element 700 may a functional equivalent of the optical element described with reference to FIG. 3.

FIG. 8 shows a plan view of an example set 800 of one or more optical elements. The set 800 of one or more optical elements may be used as the set of one or more optical elements described with reference to FIG. 1.

The set of optical element(s) 800 includes a first optical element 802 and a second optical element 804, which optical elements 802, 804 may be stacked. The first and second optical elements 802, 804 may be separate structures or, in other embodiments, opposing surfaces (e.g., opposing meta-surfaces) of a single structure. By way of example, each of the first and second optical elements 802, 804 is shown to have three different zones 806, 808, 810 or 812, 814, 816. In other embodiments, the optical elements 802, 804 may have different numbers of zones and, in some embodiments, the first optical element 802 may have a different number of zones than the second optical element 804.

In some embodiments, any photon that passes through a zone in one of the optical elements 802, 804 may pass through a corresponding zone of the other optical element 802 or 804. In some embodiments, a photon that passes through a zone in one of the optical elements 802, 804 may pass through a zone in the other optical element based on where it passes through the one optical element. In this manner, a photon that passes through a first location in zone 806 may be directed to pass through zone 812, and a photon that passes through a second location in zone 806 may be directed to pass through zone 814, and two optical elements having three zones each may create up to nine depths of focus for light passing therethrough.

Figure 9:
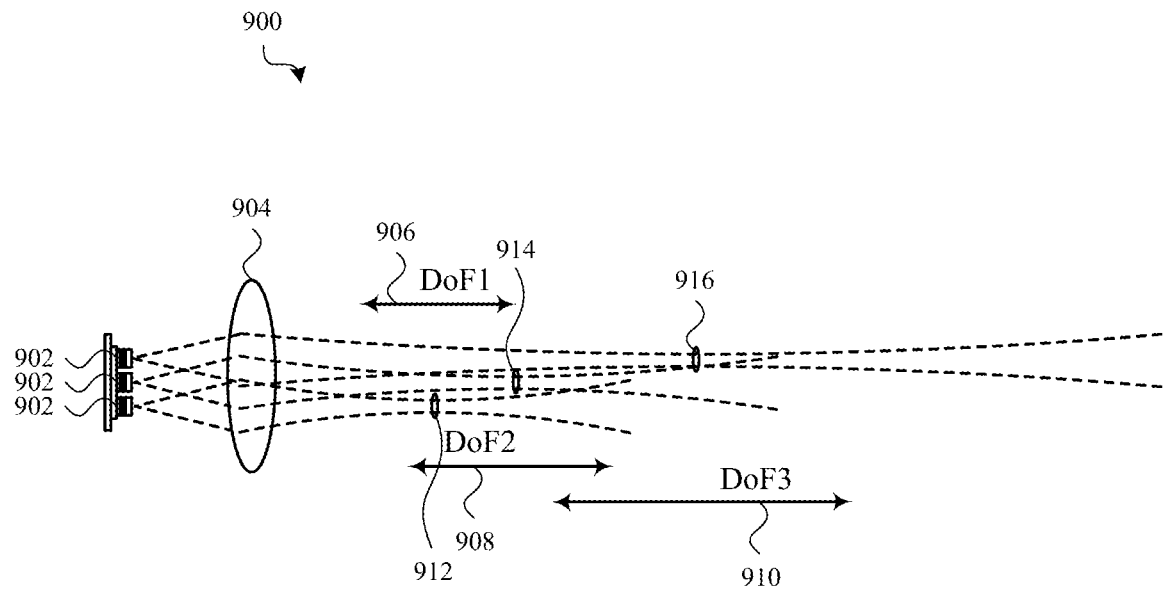
FIG. 9 shows a cross-section of an example second optical sensor module having an extended depth of focus.

FIG. 9 shows a cross-section of an example second optical sensor module 900 having an extended depth of focus. The optical sensor module 900 may include a set of interferometric sensors 902 and a set of one or more optical elements 904. The optical sensor module 900 may be used to detect the presence and/or characteristics of one or more objects within a first depth of focus 906, a second depth of focus 908, and/or a third depth of focus 910. The first, second, and third depths of focus 906, 908, 910 may be overlapping, as shown. Alternatively, the first, second, and/or third depths of focus may be disjoint from one or more others of the first, second, and/or third depths of focus.

Each of the interferometric sensors 902 may have various configurations, and in some embodiments each interferometric sensor 902 may be configured as described with reference to FIG. 1. In some embodiments, each interferometric sensor 902 may take the form of an SMI sensor or a Mach-Zender interferometer. Examples of these sensors are described with reference to FIGS. 11 and 12.

The set of one or more optical elements 904 may include a singular optical element or multiple optical elements. The optical element(s) 904 may be configured to alternately, contemporaneously, or simultaneously direct a first portion of the light emitted by each interferometric sensor 902 toward a respective first, second, or third focus area 912, 914, 916 within a respective first, second, or third depth of focus 906, 908, 910. The optical element(s) 904 may also direct portions of the emitted light that are returned from one or more objects within the first, second, or third depth of focus 906, 908, 910 toward a respective one of the interferometric sensors 902. In some embodiments, the optical element(s) 904 may include a zone plate, a birefringent material, or a zone plate including birefringent materials. The set of one or more optical elements 904 may direct light toward different ones of the focus areas 912, 914, 916 based on differences in polarization, differences in wavelength, differences in axes of orientation of different beams of light, and/or differences in other degrees of freedom In alternative embodiments of the optical sensor module 900, the module may include more or fewer interferometric sensors and depths of focus.

Figure 10:
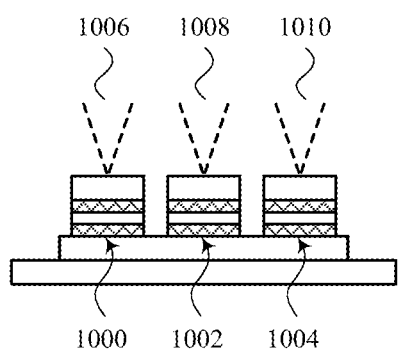
FIG. 10 shows an example set of interferometric sensors that may be used in the optical sensor module shown in FIG. 9.

FIG. 10 shows an example set of interferometric sensors 1000, 1002, 1004 that may be used in the optical sensor module shown in FIG. 9. In some embodiments, each interferometric sensor 1000, 1002, 1004 may include an SMI sensor or Mach-Zender interferometer. In some embodiments, different ones of the interferometric sensors 1000, 1002, 1004 may be tuned to emit light 1006, 1008, 1010 polarized in different ways (e.g., P-polarized light or S-polarized light), or light of different wavelengths, or light having axes oriented in different directions, and/or beams of light that vary in other degrees of freedom. The different types of light may be passed by a set of one or more optical elements in different ways.

Figure 11:
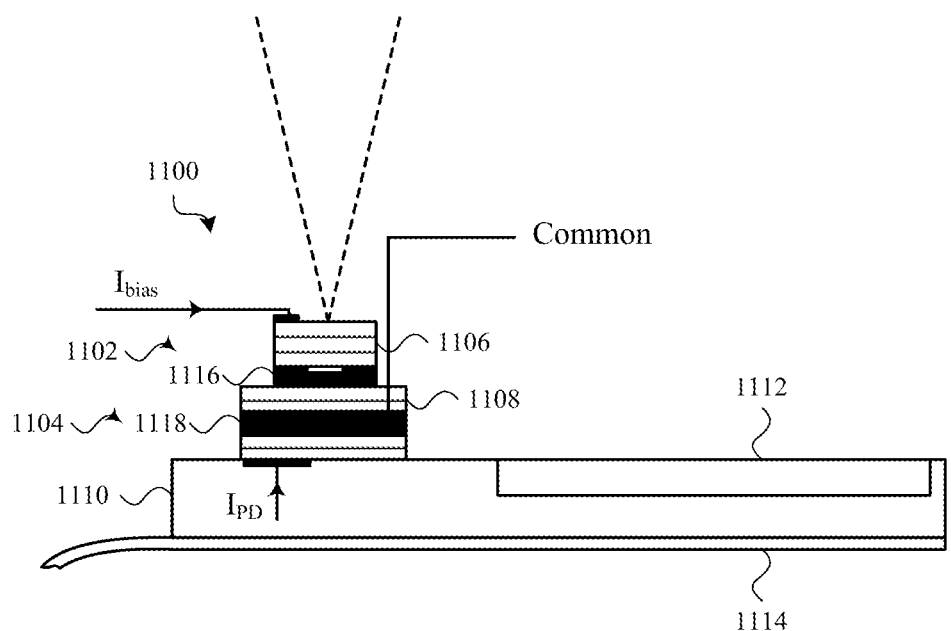
FIG. 11 shows an example self-mixing interferometry sensor that may be used in any of the optical sensor modules described herein.

FIG. 11 shows an example SMI sensor 1100 that may be used in any of the optical sensor modules described herein. The SMI sensor 1100 may include a coherent light source 1102 and an opto-electronic detector 1104 (e.g., a photodetector). By way of example, the SMI sensor 1100 is illustrated as a VCSEL with integrated photodetector (VIP) having a first distributed Bragg reflector (DBR) 1106, a second DBR, and first and second multiple quantum well (MQW) structures 1116, 1118 corresponding to the coherent light source 1102 and opto-electronic detector 1104, which MQW structures 1116, 1118 may be reverse-biased and forward-biased respectively. In alternative embodiments, the opto-electronic detector 1104 may be positioned under, over, or adjacent the coherent light source 1102, or replaced with an electrical detector that senses a junction voltage or drive current of the coherent light source 1102. In some embodiments, the VCSEL may be replaced, for example, with another type of laser or an LED.

In some embodiments, the SMI sensor 1100 may be constructed on (or attached to) an application-specific integrated circuit (ASIC) 1110 including a processor 1112. The processor 1112 may be used to operate the coherent light source 1102 and obtain and/or process an SMI signal generated by the opto-electronic detector 1104. The ASIC 1110 may in some embodiments be attached to a flexible (flex) circuit 1114 that routes signals to/from the ASIC 1110.

In operation, light emitted by the coherent light source 1102 may be directed toward a set of one or more optical elements as described herein, and portions of the emitted light returned from one or more objects may be returned through the set of one or more optical elements to a resonant cavity of the coherent light source 1102, where the returned light is self-mixed with generated light in the resonant cavity. The self-mixed light may be received by the opto-electronic detector 1104, and the opto-electronic detector 1104 may generate an SMI signal.

Figure 12:
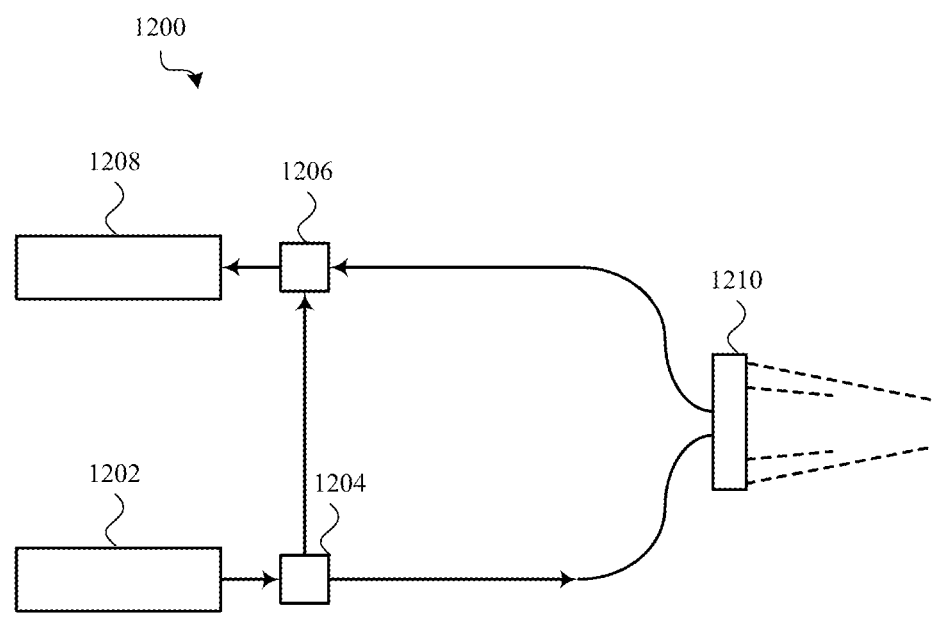
FIG. 12 shows an example Mach-Zender interferometer that may be used in any of the optical sensor modules described herein.

FIG. 12 shows an example Mach-Zender interferometer 1200 that may be used in any of the optical sensor modules described herein. The Mach-Zender interferometer 1200 may include a coherent light source 1202, a beam splitter 1204, an optical mixer 1206, and an opto-electronic detector 1208 (e.g., a photodetector). The coherent light source 1202 may take any of the forms described herein.

Light emitted by the coherent light source 1202 may be split by the beam splitter 1204. A first portion of the split beam may be directed toward the optical mixer 1206, and a second portion of the split beam may be directed toward a set of one or more optical elements 1210 as described herein. Light that passes through the set of one or more optical elements 1210 may be returned from one or more objects and pass back through the set of one or more optical elements 1210 to the optical mixer 1206, where the returned light is mixed with the second portion of the split beam. The mixed light may be directed toward the opto-electronic detector 1208, where an SMI signal is generated through coherent interference. In some embodiments, the opto-electronic detector 1208 may include a balanced pair of photodetectors, each receiving an orthogonal phase from the optical mixer 1206.

Figure 13:
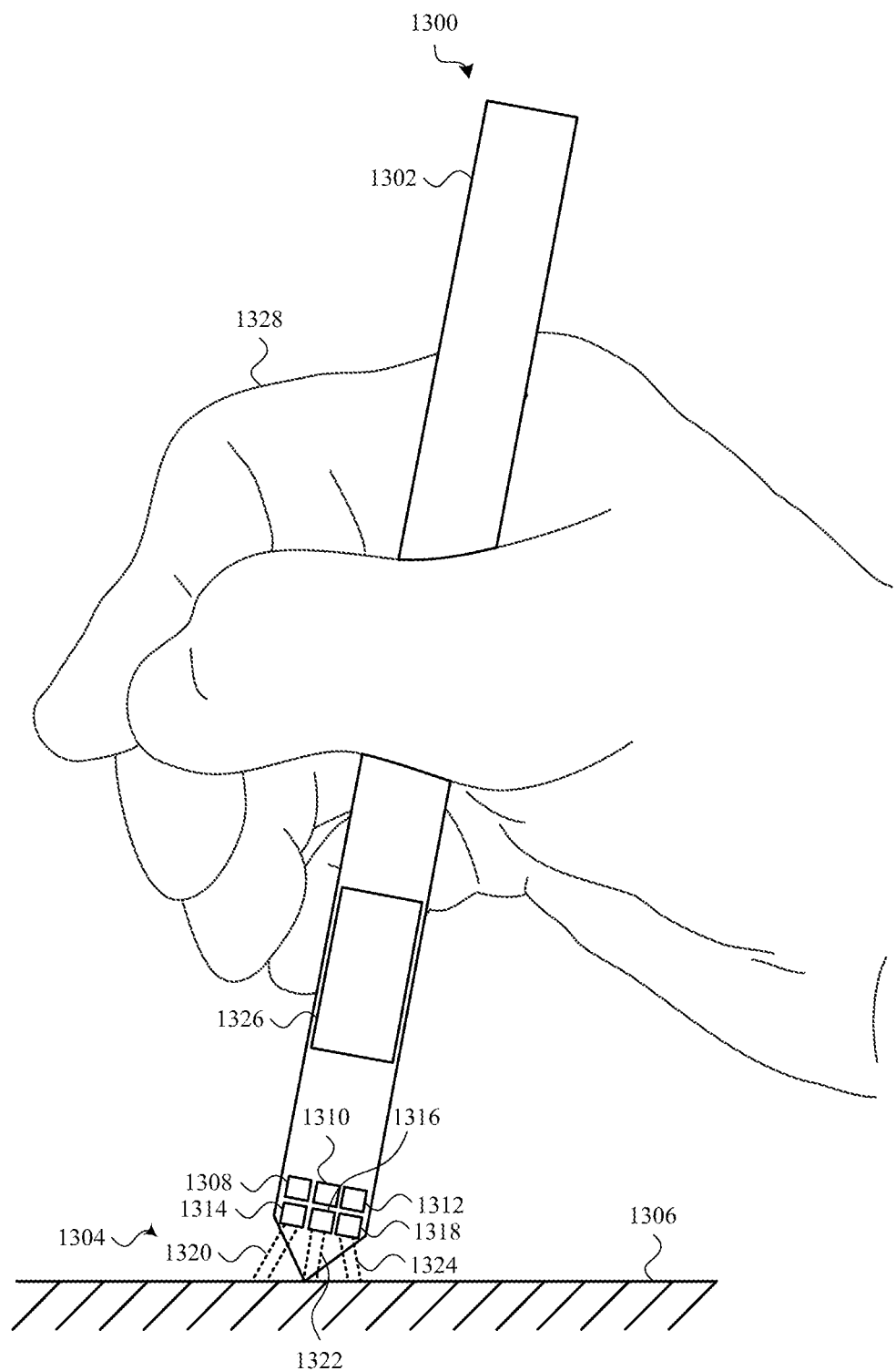
FIG. 13 shows an example hand-held input device that may include one or more of the optical sensor modules described herein.

FIG. 13 shows an example hand-held input device 1300 that may include one or more of the optical sensor modules described herein. The hand-held input device 1300 may be a writing implement (e.g., a pencil or stylus), a paintbrush, or another form of hand-held input device, and in some embodiments may be used for multiple purposes.

The hand-held input device 1300 may include an elongate housing 1302 having a surface contact end 1304. The surface contact end 1304 may be placed in contact with a surface 1306 and moved in relation to the surface 1306 to provide an input (e.g., a word or a gesture) to the hand-held input device 1300.

A set of one or more interferometric sensors 1308, 1310, 1312 may be mounted to, and in some embodiments within, the elongate housing 1302. In alternative embodiments, there may be more or fewer interferometric sensors. The one or more interferometric sensors 1308, 1310, 1312 may be configured to emit respective beams of light 1320, 1322, 1324. For each interferometric sensor 1308, 1310, 1312, a set of one or more optical elements 1314, 1316, 1318 may direct a first portion of emitted light toward a first focus area within a first depth of focus near the surface contact end 1304 of the elongate housing 1302, direct a second portion of emitted light toward a second focus area within a second depth of focus near the surface contact end of the elongate housing 1302, and direct portions of the emitted light returned from the surface 1306 toward the interferometric sensor 1308, 1310, or 1312. The different depths of focus provided for one or more of the interferometric sensors 1308, 1310, 1312 can help the hand-held input device 1300 track an extended range of absolute distance and relative displacement of the surface contact end 1304 with respect to the surface 1306 as a user 1328 holds and moves the hand-held input device 1300 at with six degrees-of-freedom with respect to the surface 1306 while providing a digital input.

Each of the interferometric sensors 1308, 1310, 1312 may be configured as described with reference to FIG. 1, or all or a subset of the interferometric sensors 1308, 1310, 1312 may be configured as described with reference to FIG. 9. In the case of an interferometric sensor 1308, 1310, or 1312 configured as described with reference to FIG. 1, light emitted by the interferometric sensor, and light returned to the interferometric sensor, may pass through a set of one or more optical elements configured as described with reference to any of FIGS. 1-8. In the case of a set of interferometric sensors 1308, 1310, 1312 configured as described with reference to FIG. 8, light emitted by the interferometric sensor, and light returned to interferometric sensor, may pass through a set of one or more optical elements configured as described with reference to FIG. 9.

A processor 1326 mounted within the elongate housing 1302 may be configured to identify an input provided by the user 1328 on the surface 1306. The input may be identified at least in part based on a set of one or more interferometric signals generated by the set of one or more interferometric sensors. Identifying the input may include determining a movement pattern of the surface contact end 1304 with respect to the surface 1306. For each interferometric sensor 1308, 1310, 1312 of the hand-held input device 1300, the processor 1326 may determine whether the surface 1306 is within the first depth of focus or the second depth of focus for the interferometric sensor.

Figure 14:
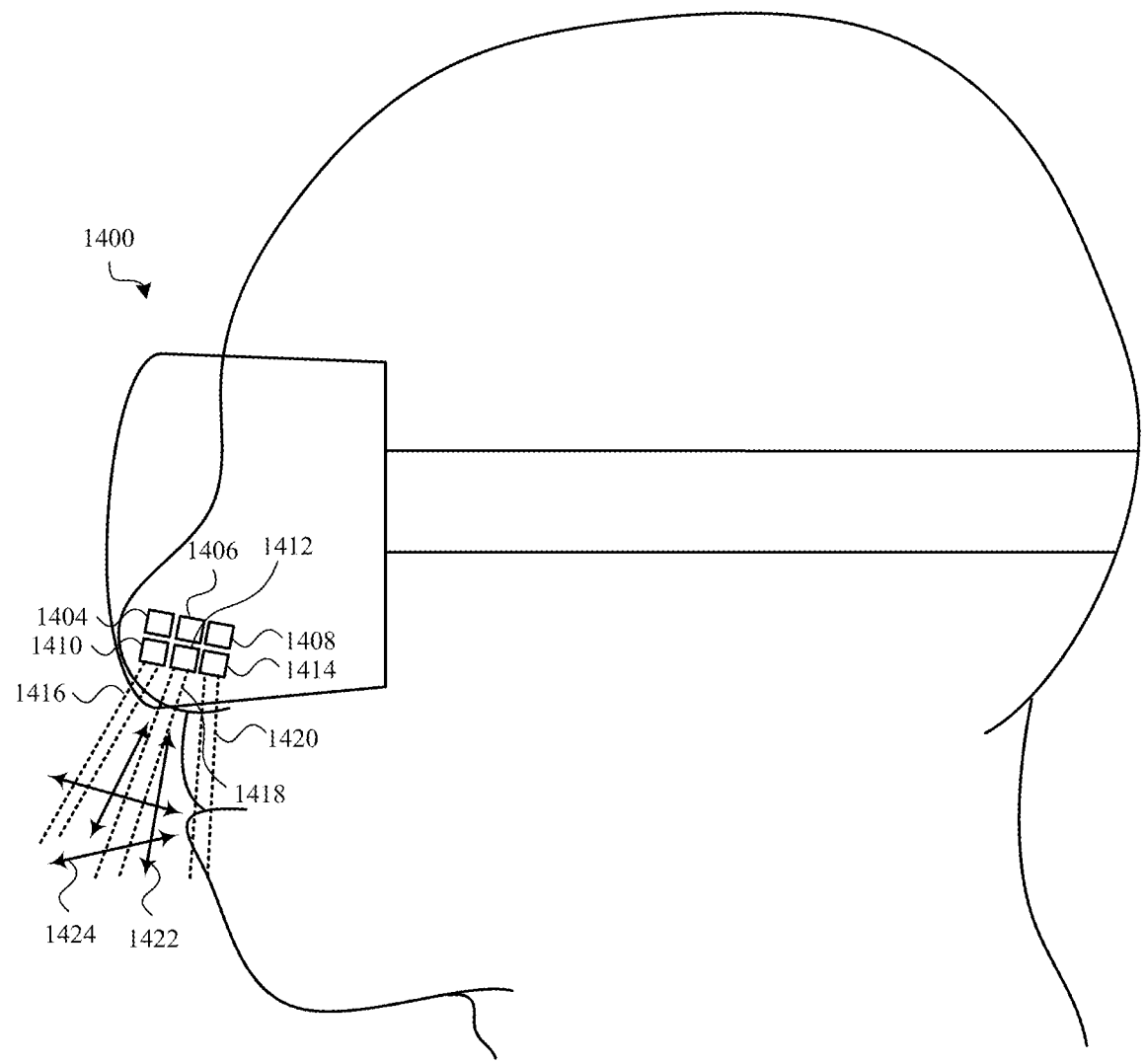
FIG. 14 shows a first example wearable device that may include one or more of the optical sensor modules described herein.

FIG. 14 shows a first example wearable device 1400 that may include one or more of the optical sensor modules described herein.

The wearable device 1400 may include a housing 1402. By way of example, the housing 1402 is shown to be a head-mountable housing, such as a headset, goggles, or pair of glasses.

A set of one or more interferometric sensors 1404, 1406, 1408 may be mounted to, and in some embodiments within, the wearable housing 1402. In alternative embodiments, there may be more or fewer interferometric sensors. Each interferometric sensor 1404, 1406, 1408 may be positioned and oriented (and/or associated optical elements may be positioned and/or oriented) to direct emitted light toward a particle flow in, out, or about a user of the wearable device 1500. The one or more interferometric sensors 1404, 1406, 1408 may be configured to emit respective beams of light 1416, 1418, 1420. For each interferometric sensor 1404, 1406, 1408, a set of one or more optical elements 1410, 1412, 1414 may direct a first portion of emitted light toward a first focus area within a first depth of focus, direct a second portion of emitted light toward a second focus area within a second depth of focus, and direct portions of the emitted light returned from one or more objects (e.g., particles) toward the interferometric sensor 1404, 1406, 1408. The different depths of focus provided for one or more of the interferometric sensors 1404, 1406, 1408 can help the wearable device 1400 detect or characterize different particle flows, such as particle flows 1422 in and out of a user's nose and particle flows 1424 in and out of a user's mouth.

Each of the interferometric sensors 1404, 1406, 1408 may be configured as described with reference to FIG. 1, or all or a subset of the interferometric sensors 1404, 1406, 1408 may be configured as described with reference to FIG. 9. In the case of an interferometric sensor 1404, 1406, 1408 configured as described with reference to FIG. 1, light emitted by the interferometric sensor, and light returned to the interferometric sensor, may pass through a set of one or more optical elements configured as described with reference to any of FIGS. 1-8. In the case of a set of interferometric sensors 1404, 1406, 1408 configured as described with reference to FIG. 8, light emitted by the interferometric sensor, and light returned to interferometric sensor, may pass through a set of one or more optical elements configured as described with reference to FIG. 9.

A processor mounted to the wearable housing 1402 or otherwise in communication with the interferometric sensors 1404, 1406, 1408 may be configured to identify a particle count, particle speed, particle size, particle direction, and/or other characteristics of particles flowing in and out of a user's nose and mouth. For each interferometric sensor 1404, 1406, 1408 of the wearable device 1400, the processor may determine whether particles are within the first depth of focus or the second depth of focus for the interferometric sensor.

Figure 15:
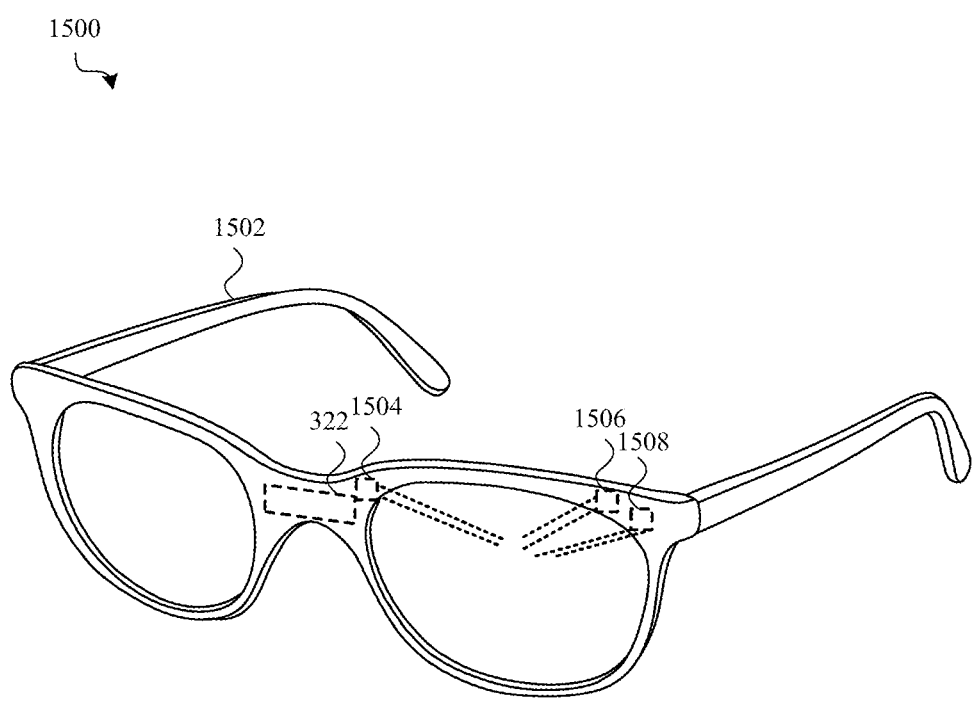
FIG. 15 shows a second example wearable device that may include one or more of the optical sensor modules described herein.

FIG. 15 shows a second example wearable device 1500 that may include one or more of the optical sensor modules described herein.

The wearable device 1500 may include a housing 1502. By way of example, the housing 1502 is shown to be a head-mountable housing, such as a pair of glasses. Alternatively, the wearable device 1500 may be a headset or goggles.

A set of one or more interferometric sensors 1504, 1506, 1508 may be mounted to, and in some embodiments within, the wearable housing 1502. In alternative embodiments, there may be more or fewer interferometric sensors. Each interferometric sensor 1504, 1506, 1508 may be positioned and oriented (and/or associated optical elements may be positioned and/or oriented) to direct emitted light toward an eye of a user of the wearable device 1500. The one or more interferometric sensors 1504, 1506, 1508 may be configured to emit respective beams of light 1510, 1512, 1514. For each interferometric sensor 1504, 1506, 1508, a set of one or more optical elements (not shown) may direct a first portion of emitted light toward a first focus area within a first depth of focus, direct a second portion of emitted light toward a second focus area within a second depth of focus, and direct portions of the emitted light returned from one or more objects (e.g., parts of an eye) toward the interferometric sensor 1504, 1506, 1508. The different depths of focus provided for one or more of the interferometric sensors 1504, 1506, 1508 can help the wearable device 1500 detect or characterize an extended range of user eye position, gaze direction, and/or movement, which in some cases can be interpreted as one or more gestures or commands. The different depths of focus can also help the wearable device 1500 identify one or more structural interfaces between structures of the eye and/or surrounding facial features, and/or depths and/or volumes of eye structures.

Each of the interferometric sensors 1504, 1506, 1508 may be configured as described with reference to FIG. 1, or all or a subset of the interferometric sensors 1504, 1506, 1508 may be configured as described with reference to FIG. 9. In the case of an interferometric sensor 1504, 1506, 1508 configured as described with reference to FIG. 1, light emitted by the interferometric sensor, and light returned to the interferometric sensor, may pass through a set of one or more optical elements configured as described with reference to any of FIGS. 1-8. In the case of a set of interferometric sensors 1504, 1506, 1508 configured as described with reference to FIG. 8, light emitted by the interferometric sensor, and light returned to interferometric sensor, may pass through a set of one or more optical elements configured as described with reference to FIG. 9.

A processor mounted to the wearable housing 1502 or otherwise in communication with the interferometric sensors 1504, 1506, 1508 may be configured to identify movements or other characteristics of a user's eye. For each interferometric sensor 1504, 1506, 1508 of the wearable device 1500, the processor may determine whether the eye, or a feature thereof, is within the first depth of focus or the second depth of focus for the interferometric sensor.

Figure 16:
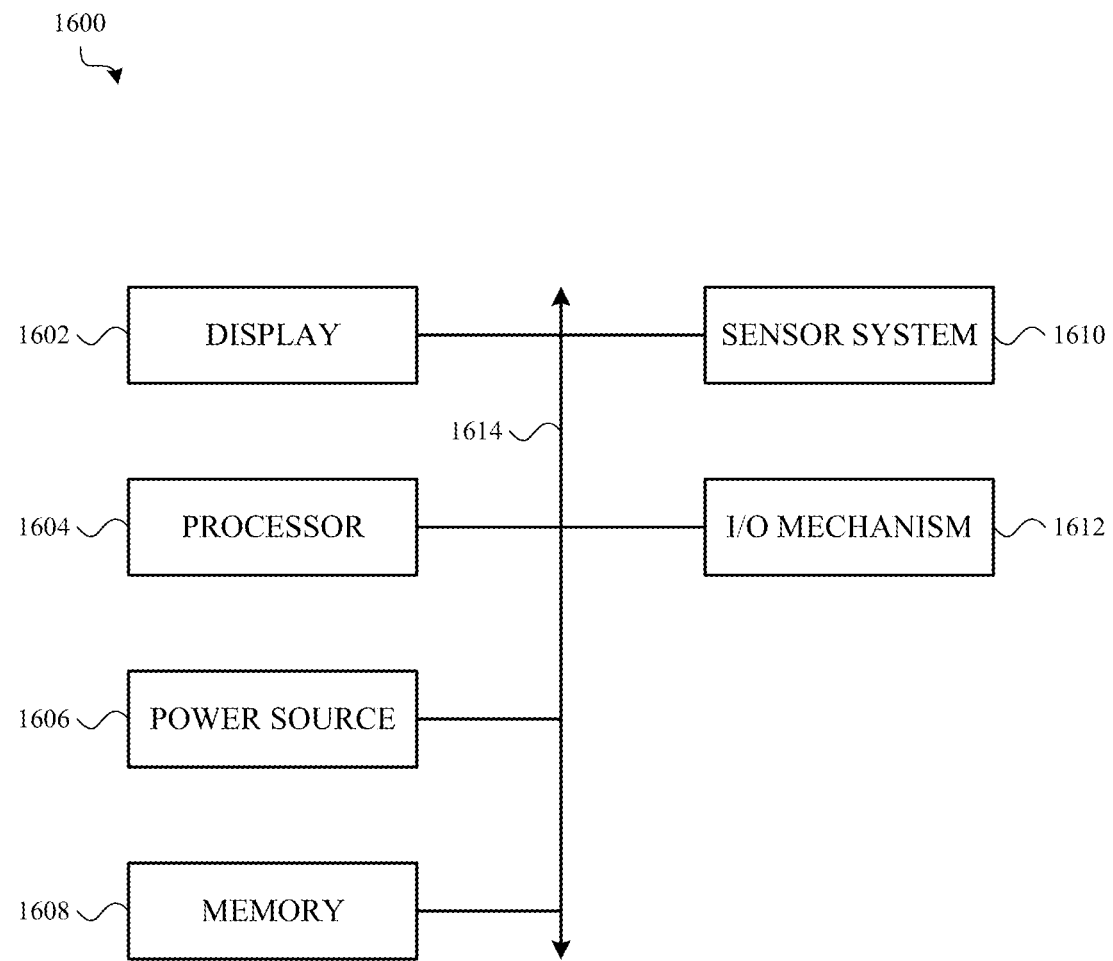
FIG. 16 shows an example electrical block diagram of an electronic device.

FIG. 16 shows a sample electrical block diagram of an electronic device 1600, which electronic device may in some embodiments be implemented as any of the devices described with reference to FIGS. 1 and 9-15. The electronic device 1600 may include an electronic display 1602 (e.g., a light-emitting display), a processor 1604, a power source 1606, a memory 1608 or storage device, a sensor system 1610, or an input/output (I/O) mechanism 1612 (e.g., an input/output device, input/output port, or haptic input/output interface). The processor 1604 may control some or all of the operations of the electronic device 1600. The processor 1604 may communicate, either directly or indirectly, with some or all of the other components of the electronic device 1600. For example, a system bus or other communication mechanism 1614 can provide communication between the electronic display 1602, the processor 1604, the power source 1606, the memory 1608, the sensor system 1610, and the I/O mechanism 1612.

The processor 1604 may be implemented as any electronic device capable of processing, receiving, or transmitting data or instructions, whether such data or instructions is in the form of software or firmware or otherwise encoded. For example, the processor 1604 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing element or elements. In some embodiments, the processor 1604 may provide part or all of the processing systems or processors described with reference to any of FIGS. 1 and 9-15.

It should be noted that the components of the electronic device 1600 can be controlled by multiple processors. For example, select components of the electronic device 1600 (e.g., the sensor system 1610) may be controlled by a first processor and other components of the electronic device 1600 (e.g., the electronic display 1602) may be controlled by a second processor, where the first and second processors may or may not be in communication with each other.

The power source 1606 can be implemented with any device capable of providing energy to the electronic device 1600. For example, the power source 1606 may include one or more batteries or rechargeable batteries. Additionally or alternatively, the power source 1606 may include a power connector or power cord that connects the electronic device 1600 to another power source, such as a wall outlet.

The memory 1608 may store electronic data that can be used by the electronic device 1600. For example, the memory 1608 may store electrical data or content such as, for example, audio and video files, documents and applications, device settings and user preferences, timing signals, control signals, and data structures or databases. The memory 1608 may include any type of memory. By way of example only, the memory 1608 may include random access memory, read-only memory, Flash memory, removable memory, other types of storage elements, or combinations of such memory types.

The electronic device 1600 may also include one or more sensor systems 1610 positioned almost anywhere on the electronic device 1600. In some embodiments, the sensor systems 1610 may include one or more interferometric sensors, positioned as described with reference to any of FIGS. 1 and 9-15. The sensor system(s) 1610 may be configured to sense one or more types of parameters, such as but not limited to, vibration; light; touch; force; heat; movement; relative motion; biometric data (e.g., biological parameters) of a user; air quality; proximity; position; or connectedness. By way of example, the sensor system(s) 1610 may include an SMI sensor, a Mach-Zender interferometer, a heat sensor, a position sensor, a light or optical sensor, an accelerometer, a pressure transducer, a gyroscope, a magnetometer, a health monitoring sensor, and/or an air quality sensor. Additionally, the one or more sensor systems 1610 may utilize any suitable sensing technology, including, but not limited to, interferometric, magnetic, capacitive, ultrasonic, resistive, optical, acoustic, piezoelectric, or thermal technologies.

The I/O mechanism 1612 may transmit or receive data from a user or another electronic device. The I/O mechanism 1612 may include the electronic display 1602, a touch sensing input surface, a crown, one or more buttons (e.g., a graphical user interface "home" button), one or more cameras (including an under-display camera), one or more microphones or speakers, one or more ports such as a microphone port, and/or a keyboard. Additionally or alternatively, the I/O mechanism 1612 may transmit electronic signals via a communications interface, such as a wireless, wired, and/or optical communications interface. Examples of wireless and wired communications interfaces include, but are not limited to, cellular and Wi-Fi communications interfaces.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

As described above, one aspect of the present technology may be the gathering and use of data available from various sources, including biometric data (e.g., information about a person's eye structure, eye movement, or breath). The present disclosure contemplates that, in some instances, this gathered data may include personal information data that uniquely identifies or can be used to identify, locate, or contact a specific person. Such personal information data can include, for example, biometric data and data linked thereto (e.g., demographic data, location-based data, telephone numbers, email addresses, home addresses, data or records relating to a user's health or level of fitness (e.g., vital signs measurements, medication information, exercise information), date of birth, or any other identifying or personal information).

The present disclosure recognizes that the use of such personal information data, in the present technology, can be used to the benefit of users. For example, the personal information data can be used to authenticate a user to access their device, or gather performance metrics for the user's interaction with an augmented or virtual world. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide data to targeted content delivery services. In yet another example, users can select to limit the length of time data is maintained or entirely prohibit the development of a baseline profile for the user. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. An optical sensor module, comprising:
    an interferometric sensor including,
        a light source configured to generate and emit a beam of light; and
        at least one detector configured to generate an interferometric signal, the interferometric signal based on an at least partially coherent mixing of light that is generated and received by the interferometric sensor; and
    a set of one or more optical elements including a zone plate, the zone plate configured to simultaneously,
        direct a first portion of the beam of light emitted by the light source toward a first focus area within a first depth of focus;
        direct a second portion of the beam of light emitted by the light source toward a second focus area within a second depth of focus; and
        direct portions of the emitted beam of light that are returned from one or more objects within the first depth of focus or the second depth of focus toward the interferometric sensor;
    the zone plate having,
        a first zone that directs the first portion of the emitted beam of light toward the first focus area; and
        a second zone, different from the first zone, that directs the second portion of the emitted beam of light toward the second focus area.

2. The optical sensor module of claim 1, wherein the first zone is configured with a first phase and the second zone is configured with a second phase, the first phase and the second phase constructively interfering in a far field overlap of light passing through the first and second zones.

3. The optical sensor module of claim 1, wherein the zone plate includes a meta-surface, the meta-surface defining the first zone and the second zone.

4. The optical sensor module of claim 1, wherein the first zone has a first object-space numerical aperture, and the second zone has a second object-space numerical aperture equal to the first object-space numerical aperture.

5. The optical sensor module of claim 1, wherein the interferometric sensor includes a self-mixing interferometry sensor.

6. The optical sensor module of claim 1, wherein the interferometric sensor includes a Mach-Zender interferometer.

7. The optical sensor module of claim 1, wherein:
the set of one or more optical elements is further configured to, simultaneously with directing the first portion of the beam of light toward the first focus area and directing the second portion of the beam of light toward the second focus area,
  direct at least one additional portion of the beam of light emitted by the light source toward at least one additional focus area within at least one additional depth of focus; and
  direct at least one additional portion of the emitted beam of light that is returned from one or more objects within the at least one additional depth of focus toward the interferometric sensor.

8. A hand-held input device, comprising:
an elongate housing having a surface contact end;
a set of one or more interferometric sensors mounted to the elongate housing, an interferometric sensor in the set of one or more interferometric sensors including,
  a light source configured to generate and emit a beam of light; and
  at least one detector configured to generate an interferometric signal in a set of one or more interferometric signals, the interferometric signal based on an at least partially coherent mixing of light that is generated and received by the interferometric sensor;
a set of one or more optical elements including a zone plate, the zone plate configured to, for the interferometric sensor and simultaneously,
  direct a first portion of the emitted beam of light toward a first focus area within a first depth of focus near the surface contact end of the elongate housing;
  direct a second portion of the emitted beam of light toward a second focus area within a second depth of focus near the surface contact end of the elongate housing; and
  direct portions of the emitted beam of light returned from a surface toward the interferometric sensor;
the zone plate having,
  a first zone that directs the first portion of the emitted beam of light toward the first focus area; and
  a second zone, different from the first zone, that directs the second portion of the emitted beam of light toward the second focus area; and
a processor mounted within the elongate housing and configured to identify an input provided by a user on a surface contacted by the surface contact end of the elongate housing, the input identified at least in part based on the set of one or more interferometric signals generated by the set of one or more interferometric sensors.

9. The hand-held input device of claim 8, wherein:
the processor is configured to determine, for the interferometric sensor, whether the surface is within the first depth of focus or the second depth of focus; and
identifying the input provided by the user includes determining a movement pattern of the surface contact end with respect to the surface.

10. A wearable device, comprising:
a wearable housing;
a set of one or more interferometric sensors mounted to the wearable housing, an interferometric sensor in the set of one or more interferometric sensors including,
  a light source configured to generate and emit a beam of light from the wearable housing; and
  at least one detector configured to generate an interferometric signal in a set of one or more interferometric signals, the interferometric signal based on at least partially coherent mixing of light that is generated and received by the interferometric sensor; and
a set of one or more optical elements including a zone plate, the zone plate configured to, for the interferometric sensor and simultaneously,
  direct a first portion of the emitted beam of light toward a first focus area within a first depth of focus;
  direct a second portion of the emitted beam of light toward a second focus area within a second depth of focus; and
  direct portions of the emitted beam of light returned from one or more objects, in the first depth of focus or the second depth of focus, toward the interferometric sensor;
the zone plate having,
  a first zone that directs the first portion of the emitted beam of light toward the first focus area; and
  a second zone, different from the first zone, that directs the second portion of the emitted beam of light toward the second focus area.

11. The wearable device of claim 10, wherein:
the wearable housing is a head-mountable housing; and
the interferometric sensor is positioned and oriented to direct the first portion of the emitted beam of light and the second portion of the emitted beam of light toward an eye of a user of the wearable device.

12. The wearable device of claim 10, wherein:
the wearable housing is a head-mountable housing; and
the interferometric sensor is positioned and oriented to direct at least one of the first portion of the emitted beam of light or the second portion of the emitted beam of light toward a particle flow in and out of a user.

13. The wearable device of claim 10, wherein:
the wearable housing is a head-mountable housing; and
the interferometric sensor is positioned and oriented to direct the first portion of the emitted beam of light toward a first particle flow in and out of a nose of a user, and to direct the second portion of the emitted beam of light toward a second particle flow in and out of a mouth of the user.

14. An optical sensor module, comprising:
an interferometric sensor including,
  a light source configured to generate and emit a beam of light; and
  at least one detector configured to generate an interferometric signal, the interferometric signal based on an at least partially coherent mixing of light that is generated and received by the interferometric sensor; and
a set of one or more optical elements including a zone plate, the zone plate configured to simultaneously,
  direct a first portion of the beam of light emitted by the light source toward a first focus area within a first depth of focus;
  direct a second portion of the beam of light emitted by the light source toward a second focus area within a second depth of focus; and
  direct portions of the emitted beam of light that are returned from one or more objects within the first depth of focus or the second depth of focus toward the interferometric sensor;
the zone plate having,
  a first set of zones that directs the first portion of the emitted beam of light toward the first focus area; and at least a second zone, different from the zones in the first set of zones, that directs the second portion of the emitted beam of light toward the second focus area.

15. The optical sensor module of claim 14, wherein the zone plate includes a meta-surface, the meta-surface defining the first set of zones and the second zone.

16. The optical sensor module of claim 14, wherein the first set of zones is dispersed within the second zone.

17. The optical sensor module of claim 14, wherein:
the at least second zone includes a second set of zones; and
the second set of zones is interspersed with the first set of zones.

18. The optical sensor module of claim 14, wherein the interferometric sensor includes a self-mixing interferometry sensor.

19. The optical sensor module of claim 14, wherein the interferometric sensor includes a Mach-Zender interferometer.

20. The optical sensor module of claim 14, wherein:
the set of one or more optical elements is further configured to, simultaneously with directing the first portion of the beam of light toward the first focus area and directing the second portion of the beam of light toward the second focus area,
direct at least one additional portion of the beam of light emitted by the light source toward at least one additional focus area within at least one additional depth of focus; and
direct at least one additional portion of the emitted beam of light that is returned from one or more objects within the at least one additional depth of focus toward the interferometric sensor.

* * * * *